Figures 1, 2:
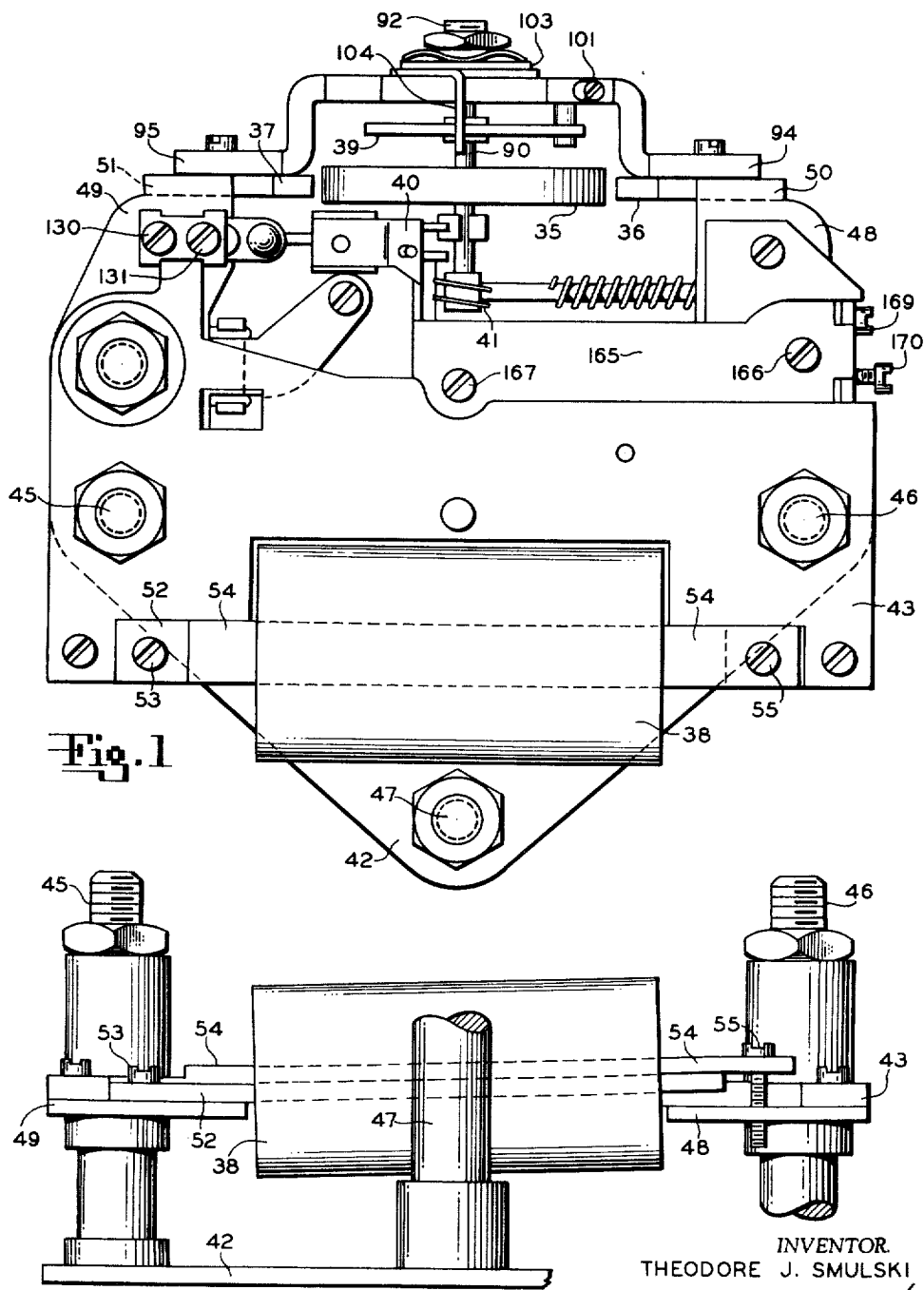

Dec. 10, 1963     T. J. SMULSKI     3,114,064
CLOCK TYPE ELECTRIC MOTOR STATOR STRUCTURE
Original Filed Nov. 29, 1955     3 Sheets-Sheet 1

INVENTOR.
THEODORE J. SMULSKI
BY
ATTORNEYS

INVENTOR
THEODORE J. SMULSKI
BY
ATTORNEYS

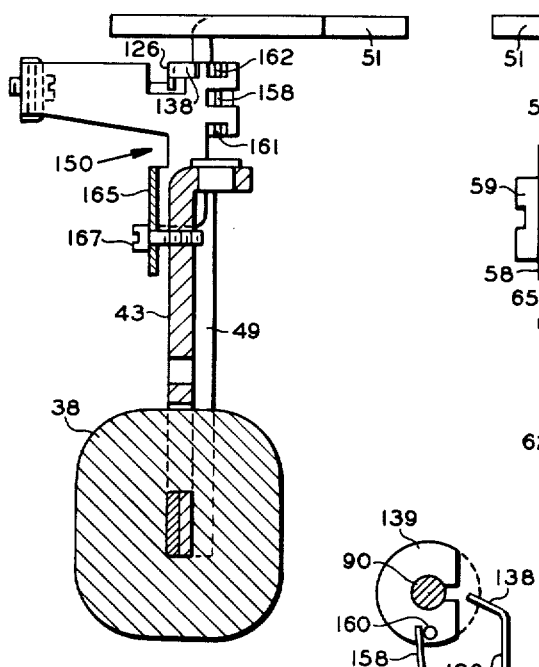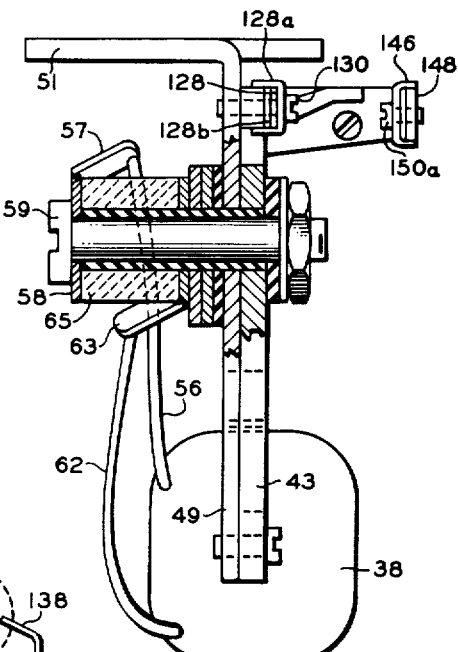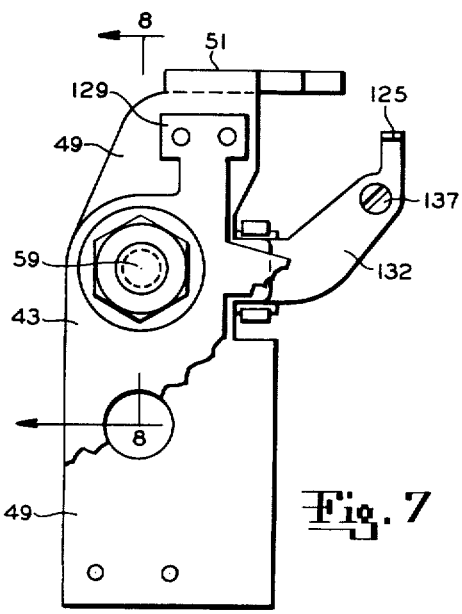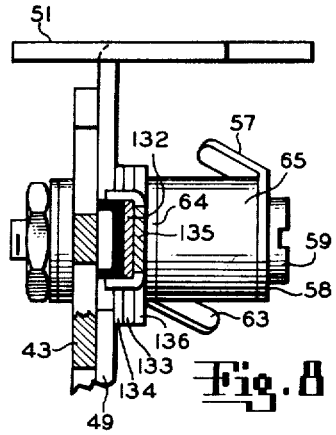

United States Patent Office 3,114,064
Patented Dec. 10, 1963

3,114,064
CLOCK TYPE ELECTRIC MOTOR STATOR
STRUCTURE
Theodore J. Smulski, Munster, Ind., assignor to The
Anderson Company, a corporation of Indiana
Original application Nov. 29, 1955, Ser. No. 549,709, now
Patent No. 2,979,629, dated Apr. 11, 1961. Divided
and this application Aug. 28, 1958, Ser. No. 757,883
9 Claims. (Cl. 310—259)

This invention relates generally to a stator structure for electric motors, and while certain broad aspects of the structure are applicable to rotary motors, it is of marked utility in the field of oscillatory motors and is intended more particularly for an electric clock.

This application is a division of my copending application Serial No. 549,709 filed November 29, 1955, now Patent No. 2,979,629, to which reference may be made for a specific usage of the structure of this application, as well as for detailed disclosure of certain subsidiary items alluded to herein.

It is deemed sufficient and helpful to note here that in the parent case, a pivotal oscillatory element is arranged to drive suitable clock mechanism as it oscillates, and electro-mechanical transducer means are provided for driving the oscillatory element, such means being energized in synchronism with the movement of the oscillatory element. The electro-mechanical transducer means is illustrated as an electro-magnetic arrangement in which the oscillatory element forms an armature of a magnetic material, such as soft iron, disposed between two poles of an electro-magnet stator structure, the armature being urged by magnetic forces into alignment with the magnetic flux path between the poles when the electro-magnet is energized. The oscillatory element is urged toward a neutral position by a restoring force, and may move in one direction from a first position through such neutral position to a second position and then in a reverse direction back through the neutral position to the first position. The transducer means is such that it acts generally in opposition to the restoring force so that when the oscillatory element is between the first position and the neutral position, energization of the transducer means will urge the element toward such first position, while when the element is between the neutral position and the second position, energization of the transducer means will urge the element toward such second position. Contact means and circuitry are controlled by movement of the oscillatory element for energizing the transducer means when the element moves in either direction beyond such neutral position.

A specific feature of the invention is the construction of the electro-magnet or stator structure above referred to in which the poles can be readily adjusted into properly spaced relation to the armature, and in which the strength, magnetic, of the magnet can be readily adjusted to a nicety.

An object of this invention is to provide an improved electric clock having a readily adjustable electro-magnet assembly.

A further object is to provide an extremely simple and cheap arrangement in a stator structure whereby the pole elements may be adjusted toward or away from the armature without use of specialized tools.

A still further object is the provision of a stator structure incorporating means for adjusting the magnetic strength of the pole pieces.

Figure 3:
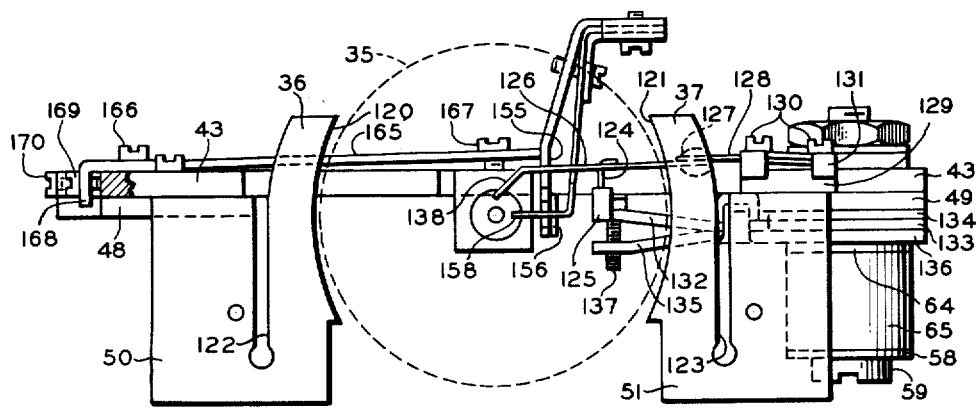
Figure 4:
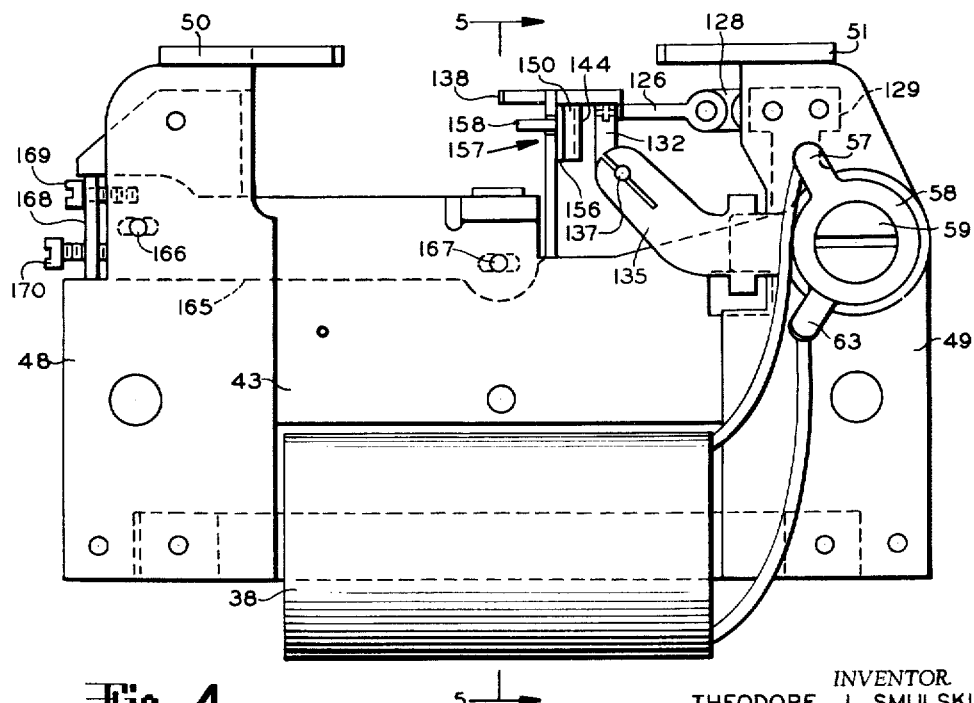

This invention contemplates other and more specific objects, features and advantages which will become more fully apparent from the following detailed description taken in conjunction with the accompanying drawings which illustrate a preferred embodiment and in which:

FIGURE 1 is a rear elevational view of the mechanism, stripped of its casing;
FIGURE 2 is a bottom plan view of the energizing coil 38 of the stator structure;
FIGURE 3 is a top plan view of an assembly of only certain elements of the mechanism of FIGURE 1;
FIGURE 4 is a front elevational view of the arrangement of FIGURE 3;
FIGURE 5 is a sectional view taken substantially along line 5—5 of FIGURE 4;
FIGURE 6 is a side elevational view of the arrangement of FIGURE 4, certain portions being shown in section;
FIGURE 7 is a rear elevational view of a right-hand portion of the assembly as viewed in FIGURE 4;
FIGURE 8 is a sectional view taken substantially along line 8—8 of FIGURE 7;
FIGURE 9 is a detail view of the contacts.

In general, the mechanism of the clock includes a pivotal oscillatory element 35 in the form of an armature of magnetic material movable between a pair of pole elements 36 and 37 of an electro-magnet having an energizing coil 38. The armature element 35 is urged by a suitable spiral hair spring 39 to a neutral position and, when the coil 38 of the electro-magnet is energized, the armature 35 will be oscillated by the magnetic forces of the electro-magnet into alignment with the flux between the poles 36 and 37.

It will be appreciated that the element 35 will tend to oscillate at a rate determined by its inertia and the characteristics of the spring 39 and, by energizing the electro-magnet coil 38 at appropriate portions of the cycle of movement of the element 35, it may be maintained in oscillation. Accordingly, a contact arrangement, indicated generally at 40, is provided which is actuated by movement of the element 35 to control energization of the coil 38, as will appear from the parent application.

Means generally designated by reference numeral 41 are provided for transforming the reciprocating oscillatory movement of the element 35 into rotary movement which is used to drive the hands of the clock through a suitable gear train, as will be understood from the parent application.

The mechanism may be supported from a forward vertical frame plate 42 and a rearward frame plate 43 which are supported in fixed parallel relation to each ohter by means of posts 45, 46, and 47. The frame plates 42 and 43, and especially the rearward plate 43, are preferably of a non-magnetic material such as brass and a pair of plates 48 and 49 of magnetic material, such as soft iron are disposed on the forward face of the rearward plate 43, adjacent opposite side portions thereof, the plates 48 and 49 having forwardly turned upper flat end portions 50 and 51 which may be formed to define the poles 36 and 37 in a manner as will be described in detail hereinafter. A core element 52, of magnetic material, is secured by a screw 53 to the lower rearward surface of the plate 49 and extends inside the coil 38 with a second core element 54 secured against the element 52 being connected to the lower end of the plate 48 through an adjustment screw 55. The elements 52 and 54 are preferably so formed that their inherent resiliency urges the right-hand end thereof (as viewed in FIGURES 1 and 2) away from the plate 48, and by rotating the screw 55 the core elements 52 and 54 may be moved toward and away from the plate 48 to vary the air gap and thus vary the strength of the magnetic field produced by the coil 38.

To energize the coil 38, one end thereof is connected through a wire 56 to a lug 57 to a terminal plate 58 at one end of a terminal post 59 (FIGURE 6), the other end of the terminal post 59 being arranged to be connected to one terminal of a source, such as a battery. The other end of the coil 38 is connected through a wire 62 to a lug 63 of a terminal plate 64 on the post 59 in spaced relation to the plate 58, with a resistance element 65 between the plates 58 and 64, to absorb energy released by the coil 38 when it is de-energized. The plate 64 is arranged to be connected through the contact assembly 40 to the frame of the mechanism which is arranged to be connected to a terminal of the source, thus completing the circuit through the coil 38.

As above indicated, the mechanism 41 is arranged to convert the oscillatory movement of the element 35 into rotating movement, the details being fully disclosed in the parent application.

The oscillatory armature element 35 is supported on a vertical shaft 90 the upper end of which is journalled by a bearing fitted into the lower end of a screw 92 threaded into an inverted U-shaped bracket having ends 94 and 95 secured by screws to the flat end portions 50 and 51 of the members 48 and 49.

For adjusting the effective action of the coiled hair spring 39, a plate 103 pivotal about the axis of the screw 92 has a down-turned bifurcated portion 104 embracing a point of the outer convolution of the hair spring 39, the effective tension of the spring 39 being adjustable by rotation of the plate 103.

A specific feature of the invention is in the construction of the poles 36 and 37 so that they may be readily adjusted into optimum relation to the armature element 35. As shown in FIGURE 3, the flat end portions 50 and 51 of the members 48 and 49, which portions define the poles 36 and 37, have arcuate edges 120 and 121 complementary to the periphery of the element 35, and slots 122 and 123 are formed in the portions 50 and 51 in spaced generally parallel relation to the edges 120 and 121. The inner end of each slot 122 and 123 terminates in a somewhat enlarged area for further weakening the soft metal comprising the pole pieces for ready deformation. By inserting the blade of a screwdriver or similar tool into the slots 122 and 123, the edges 120 and 121 may be readily brought into properly spaced relation to the periphery of the element 35. It is apparent that insertion of the screwdriver near the open end of either slot will tend to bend the pole piece, whereas insertion of the screwdriver near the closed end of the slot will tend to displace the entire pole piece toward the armature.

Highly important to precise operation of the device is the construction of the contact means 40 for energizing the coil 38 in synchronism with the oscillatory movement of the element 35. However, since the coil energization control structure is only ancillary to the stator structure herein claimed, reference is made to the parent application for full disclosure. In general, the contact means 40 comprises a movable contact 124 engageable with a stationary contact 125, the contact 125 being connected to the plate 64 and thus to one side of the coil 38 with the movable contact 124 being electrically connected to the frame of the mechanism, so that when the contact 124 is engaged with the contact 125, a circuit is completed through the coil 38.

The movable contact 124 is preferably formed of a separate piece of flat stock of a suitable electric contact material, such as silver or platinum, and is fixedly secured by welding or soldering to a relatively rigid actuating arm 126. The contact 124 actually lies normal to the plane of the arm 126 and depends therefrom so that only the free edge of the contact proper is utilized as the contacting area. The arm 126 is riveted, as at 127, or otherwise secured to one end of a flat spring 128, the other end of the spring being interposed between a pair of spring plates 128a and 128b secured to a portion 129 of the rearward frame plate 43 by a screw 130. A second screw 131 is threadedly received by the plate portion 129 and serves to urge the offset outer ends of the spring plates 128a and 128b toward the frame plate portion 129. Obviously, adjustment of the screw 131 toward the portion 129 will urge the contact 124 downwardly to increase the contact pressure between the contacts 124 and 125. Conversely, loosening of the screw 131 will relieve the contact pressure.

The stationary, but adjustable contact 125 is similar to the contact 124 and is a separate contact element secured to a resilient arm 132 having a portion 133 secured to the terminal post 59, an insulating washer 134 being disposed between the portion 133 and the member 49. A second arm 135 of configuration similar to the arm 132, but rigid throughout its length, has a portion in spaced relation in front of the arm 132 and a portion 136 disposed between the portion 133 of the member 132 and the plate 64 on the terminal post 59, to complete an electrical circuit therebetween. A screw 137 extends through the arm 132 and is threaded into the arm 135, so that by rotation of the screw 137, the position of the fixed contact 125 may be adjusted. It will be noted that the contacting edges of the contacts 124 and 125 lie normal to one another, and the resulting very small contact area requires very little contact pressure, thereby reducing the load on the contact actuating mechanism.

The contact arm 126 is so supported that it urges the contact 124 into engagement with the contact 125. To disengage the contact 124 from the contact 125, the arm 126 has an end portion 138 actuated by a cam member affixed to the shaft 90.

The control arm 144 has a supporting leg or flange portion extending normally from its rearward end, the flange portion being disposed between one leg 146 of a generally L-shaped clamping member and one leg 148 of a generally L-shaped portion of a support bracket. A screw 150a extends through the flange portion 146 and is threaded into the leg 148 to rigidly secure the flange portion 145 to the bracket 150 (FIGURE 6).

For actuating the control arm 144 to release the contact arm 126 so that the contacts 124 and 125 may abut, the arm 144 has a forwardly projecting flange at its lower end. The flange engages a base portion 156 of a rockable or reciprocable release plate 157 (FIGURE 4) which has an integral leg portion 158 extending through an opening in the control bracket 150 to lie in the path of an actuating pin carried by a cam member on the armature shaft. The flange of the control arm 144 has a pair of projections 161 and 162 (FIGURE 5) extending into slots and in the base portion 156 of the plate 157, to maintain the plate 157 and the arm 144 in proper relation.

In operation, when the shaft 90 rotates in one direction, the pin on shaft 90 will engage the leg 158 of the plate 157 to rock the plate about the point engagement of the rearward of the base portion 156 thereof with the portion 155 of the support bracket 150 and the base portion 156 will serve to move the forward end of the control arm 144 moving the arm 144 to reduce frictional engagement with the edge of the slot in the contact arm 126, to thus release the arm 126 and allow the contact 124 to engage the contact 125. Similarly, when the shaft 90 is rotated in the opposite direction, the pin may engage the leg 158 of the device 157 to rock the device about the point of engagement of the base portion 156 with the portion 155 of the support bracket 150 and thus move the control arm 144 and reduce frictional engagement with the edge of the slot, and thus again allow movement of the arm 126 to engage the contact 124 with the contact 125.

To equalize the closing time of the contacts 124 and 125 in each oscillatory cycle of the shaft 90, the relative positions of the portions of the support bracket 150 may be adjusted.

As mentioned above, a screw is used to initially set the frictional pressure between the control arm 144 and the edge of the slot in the contact arm 126. The time of closing of the contacts 124 and 125 can thus be regulated by varying the free-rocking motion of the plate 157, i.e. the amount of movement of the plate 157 which is tolerated before release of the arm 126. For this purpose, the opening in the base portion 165 of the support bracket 150 through which the screw 167 extends is in the form of a slot, to allow movement of the bracket 150 to the right or left as viewed in FIGURE 3 for example. To control this movement, the base portion 165 of the support bracket 150 has a forwardly turned flange portion 168 adjacent one edge of the frame plate 43 and a first adjustment screw 169 extends through the flange portion 168 and is threaded into the plate 43 with a second adjustment screw 170 threaded through the flange portion 168 and engageable with the edge of the plate 43. Thus, by adjustment of the screws 169 and 170, the support bracket 150 may be moved to the right or to the left as viewed in FIGURE 3. After such adjustment, the bracket can be locked in position by the screws 170, 169, and 166.

*Operation*

For reasons to be explained in detail later, the normal position of the contacts 124 and 125 is closed, i.e. the positions of FIGURE 3. When the clock 30 is energized, as by connecting a suitable direct current source, such as a battery, between the terminal post 59 and the frame of the mechanism, the coil 38 will be energized. The armature element 35 will be moved in one or the other direction of oscillation, the direction of initial movement depending upon the position of the armature relative to the pole pieces 36 and 37.

The contacts 124 and 125 are closed by a relatively limited displacement of the shaft 90 from its neutral position at which the armature 35 is positioned symmetrically between the pole pieces 36 and 37.

Upon de-energization of the device, the armature 35 continues to oscillate, because of its inertia, the arcuate displacement of the armature diminishing. Initially upon de-energization, the cam and the pin sequentially open and close the contacts 124 and 125, but as the magnitude of armature displacement becomes less, the cam does not open the contacts 124, 125, although the pin will rock the release plate 157 to close the contacts. Thus, the contacts remain closed when the armature comes to rest. Of course, the armature is never exactly centralized between the pole pieces, but will lie approximately centrally therebetween.

It will be understood that modifications and variations may be effected without departing from the spirit and scope of the novel concepts of the present invention.

I claim:

1. In apparatus of the kind described, a frame structure for rotatively mounting a shaft having an annular armature, said frame including a plate of non-magnetic material, a pair of spaced elongate plates of magnetic material carried by said frame plate, said magnetic plates extending parallel to the axis of said armature and spaced a distance generally corresponding to the diameter of said armature, one pair of ends of said magnetic plates projecting beyond the non-magnetic frame plate, and the other pair of ends extending transversely substantially at right angles to the plane of said frame plate and defining poles for disposition of the armature therebetween, and an electro-magnet including a core electrically connecting the projecting ends of said magnetic plates.

2. A stator structure comprising a pair of elongate stator plates each having at one end an integral flat portion extending at a substantially right angle to the plane of its respective plate to locate said flat portions in opposed relation, and each of said flat portions having a narrow deformable arcuate pole element connected thereto for partially encircling an armature.

3. A stator structure having at least two poles, each in the form of a soft iron plate to be positioned on the opposite side of an armature with the plates lying in substantially the same plane, each of said plates including an arcuate portion for partially encircling said armature, each of said plates being formed with a straight slot extending from one edge inwardly along and spaced from and to a point beyond said arcuate portion for converting each of said arcuate portions into a deformable pole piece.

4. A stator structure for attachment to a rotor bearing frame, comprising a pair of stator plates to be supported by said frame parallel to the axis of a rotative armature and in spaced relation corresponding generally to the diameter of the armature, one end of each of said plates being formed with an integral soft iron pole portion extending at a right angle to the plane of the plate, each of said pole portions having a curved edge to conform to the armature and a slot extending from an edge thereof inwardly along and spaced from said curved edge whereby to form a narrow deformable pole element including said curved edge, the inner end of each slot terminating in an enlarged opening, whereby the end of either pole element may be bent of the entire pole element shifted by manipulating an instrument in said slot.

5. In an electric clock or the like, an electro-magnet comprising a pair of spaced generally parallel legs of magnetic material, an elongate core of magnetic material having one end secured to one of said legs with the other end of said core disposed in spaced overlapping relation to one end of the other of said legs, a coil on said core, and screw means passing through said other end of said leg and said other end of said core for adjustably moving said other end of the core toward said one end of said other of said legs to fixedly adjust the reluctance of the magnetic flux path presented to said coil.

6. Apparatus of the kind described comprising a frame for supporting an oscillatory armature, said frame including a vertical plate of non-mangetic material, a pair of spaced elongate soft iron stator plates carried by said frame plate and extending vertically along the side edge portions thereof, the lower ends of said stator plates extending below said frame plate, the upper ends of said stator plates terminating in horizontally disposed pole portions to receive the armature therebetween, each of said pole portions including an integral narrow deformable strip and an inner edge curved to conform with the curvature of an armature, an elongate core having one end secured to the lower end of one of said stator plates and a free end overlapping the corresponding end of the other stator plate, said core being inherently biased to urge its free end away from said other stator plate, a coil surrounding said core, and means for adjusting the free end of said core toward said other stator plate.

7. A stator structure for an electric clock or the like, comprising an electromagnet structure terminating in a pair of opposed pole units to be arranged diametrically of an oscillatable armature, each of said units comprising a flat, elongate, generally rectilinear plate having a straight slot extending inwardly from an edge thereof with respect to one of its adjacent edges to define a deformable pole piece, and each of said pole pieces being provided with an arcuate edge, said arcuate edges being disposed in opposed relation to partially embrace an armature.

8. A stator structure having two poles, each in the form of a soft iron plate to be positioned on the opposite sides of an armature with the plates lying in substantially the same plane, each of said plates including an arcuate portion for partially encircling said armature, at least one of said plates being formed with an elongate slot extending from one edge thereof along and spaced from and to a point beyond its arcuate portion for converting said arcuate portion into a deformable pole piece.

9. An assembly of the kind described comprising a frame, an armature supported in said frame for oscillation, a pair of stator plates supported by said frame, each of said plates being provided with a movable arcuate pole portion partially encircling said armature, means whereby said pole portions may be adjusted with respect to one another and said armature, a coil having an elongate core extending therethrough, means connecting the ends of said core to said plates, and means whereby said core and coil as a unit may be adjusted to vary the reluctance of the magnetic flux path presented to said coil.

References Cited in the file of this patent

UNITED STATES PATENTS

| | | |
|---|---|---|
| 2,265,781 | Schweitzler | Dec. 9, 1941 |
| 2,559,738 | Schweitzler | July 10, 1951 |
| 2,562,734 | Phaneuf | July 31, 1951 |
| 2,631,292 | Amend | Mar. 24, 1953 |
| 2,712,758 | Scaaf | July 12, 1955 |
| 2,715,690 | Neuenschwander | Aug. 16, 1955 |

FOREIGN PATENTS

| | | |
|---|---|---|
| 812,177 | Germany | Aug. 27, 1951 |

UNITED STATES PATENT OFFICE
CERTIFICATE OF CORRECTION

Patent No. 3,114,064 December 10, 1963

Theodore J. Smulski

It is hereby certified that error appears in the above numbered patent requiring correction and that the said Letters Patent should read as corrected below.

Column 2, line 70, for "to", second occurrence, read -- of --; column 6, line 17, for "of" read -- or --; column 8, line 2, for "2,631,292" read -- 2,632,292 --.

Signed and sealed this 15th day of September 1964.

(SEAL)
Attest:

ERNEST W. SWIDER
Attesting Officer

EDWARD J. BRENNER
Commissioner of Patents